(12) United States Patent
Kosaka

(10) Patent No.: US 8,606,468 B2
(45) Date of Patent: Dec. 10, 2013

(54) VEHICLE

(75) Inventor: Yusuke Kosaka, Chofu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 273 days.

(21) Appl. No.: 13/125,893

(22) PCT Filed: Mar. 12, 2010

(86) PCT No.: PCT/JP2010/001806
§ 371 (c)(1),
(2), (4) Date: Apr. 25, 2011

(87) PCT Pub. No.: WO2011/111123
PCT Pub. Date: Sep. 15, 2011

(65) Prior Publication Data
US 2012/0035809 A1  Feb. 9, 2012

(51) Int. Cl.
*B62K 17/00* (2006.01)

(52) U.S. Cl.
USPC ....... 701/49; 280/6.152; 280/5.509; 280/771; 280/87.1; 180/6.58; 180/219; 180/273

(58) Field of Classification Search
USPC ............ 701/49, 124; 280/6.152, 5.509, 280/124.103, 771, 87.1; 180/6.58, 219, 180/272, 273
See application file for complete search history.

(56) References Cited

U.S. PATENT DOCUMENTS

2008/0147281 A1* 6/2008 Ishii et al. ............ 701/49
2010/0030440 A1* 2/2010 Kosaka .................. 701/70

FOREIGN PATENT DOCUMENTS

| JP | 3070015 A | | 5/2000 |
|---|---|---|---|
| JP | 2004-500271 A | | 1/2004 |
| JP | 2006-001384 A | | 1/2006 |
| JP | 2006001385 A | * | 1/2006 |
| JP | 2006-315666 A | | 11/2006 |
| JP | 3981733 A | | 9/2007 |
| JP | 2008-120347 A | | 5/2008 |
| JP | 2009-023652 A | | 2/2009 |
| JP | 2009-120176 A | | 6/2009 |
| JP | 2010-030568 A | | 2/2010 |
| WO | 2009/054208 A1 | | 4/2009 |

OTHER PUBLICATIONS

International Search Report of PCT/JP2010/001806, Jun. 15, 2010.

* cited by examiner

*Primary Examiner* — Khoi Tran
*Assistant Examiner* — Adam Mott
(74) *Attorney, Agent, or Firm* — Kenyon & Kenyon LLP

(57) ABSTRACT

To provide a vehicle capable of maintaining a stable state when a rider gets on the step plate or get off the step plate. A vehicle is a vehicle that performs a turning movement based on the rotation of step plates on which a rider rides in the left/right direction. The vehicle includes restriction means to enable the rotation of the step plates in the left/right direction to be restricted. The vehicle preferably further includes first control means that controls the restriction means so that the rotation of the step plates in the left/right direction is restricted when the rider gets on the step plates or gets off the step plates.

8 Claims, 13 Drawing Sheets

VEHICLE

This is a 371 national phase of PCT/JP2010/001806 filed 12Mar. 2010, the content of which is incorporated herein by reference.

TECHNICAL FIELD

The present invention relates to a vehicle, in particular a vehicle that a rider can safely get on/off.

BACKGROUND ART

For example, as disclosed in Patent literatures 1 and 2, vehicles that perform a turning movement based on the rotation of the step plate on which the rider rides to the left or right have been known. In particular, the vehicle disclosed in Patent literature 1 includes a vehicle main body having a parallel linkage including left and right vertical links and top and bottom horizontal links. Further, a step plate is provided on the upper end of each of the left and right vertical links. Note that the vehicle disclosed in Patent literature 2 includes inclination detection means to detect the relative inclination angle of the step plates with respect to the vehicle main body as a movement in the left/right direction.

Incidentally, the vehicle disclosed in Patent literature 3 performs a turning movement based on the rotation angle of a handle bar that is rotatably provided on the step plates.

CITATION LIST

Patent Literature

Japanese Unexamined Patent Application Publication No. 2006-315666
Japanese Patent No. 3981733
Japanese Patent No. 3070015

SUMMARY OF INVENTION

Technical Problem

The vehicles disclosed in Patent literatures 1 and 2 have such a configuration that the step plates rotate in the left/right direction. Therefore, when a rider takes such a posture that only one foot is put on a step plate as the rider tries to get on the step plates or get off the step plates, the step plates could rotate. Thus, the vehicle becomes unstable state.

The present invention has been made to solve the problem like this, and an object thereof is to provide a vehicle capable of maintaining a stable state when a rider gets on the step plate or gets off the step plate.

Solution to Problem

A vehicle in accordance with the present invention is a vehicle that performs a turning movement based on a rotation of a step plate on which a rider rides in a left/right direction, including restriction means to allow the rotation of the step plate in the left/right direction to be restricted. With the configuration like this, when a rider gets on the step plate or gets off the step plate, the rotation of the step plate in the left/right direction is restricted by the restriction mechanism. As a result, the rider can get on the vehicle 1 or get off the vehicle 1 in a stable state.

The vehicle preferably further includes first control means to control the restriction means so that the rotation of the step plate in the left/right direction is restricted when the rider gets on the step plate or the rider gets off the step plate.

The vehicle preferably further includes: first detection means to detect a rotation angle of the step plate; and second detection means to detect a load exerted on the step plate, wherein the first control means preferably starts getting-off assist control in a state where the rotation of the step plate in the left/right direction is permitted; when determined that the step plate is in a roughly horizontal state based on the rotation angle of the step plate detected by the first detection means, controls the restriction means so that the rotation of the step plate in the left/right direction is restricted; and when determined that the rider has gotten off the step plate based on the load exerted on the step plate that is detected by the second detection means, finishes the getting-off assist control in a state where the rotation of the step plate in the left/right direction is restricted, and the first control means preferably starts getting-on assist control in a state where the rotation of the step plate in the left/right direction is restricted; when determined that the rider has gotten on the step plate based on the load exerted on the step plate that is detected by the second detection means, controls the restriction means so that the rotation of the step plate in the left/right direction is permitted; and finishes the getting-on assist control in a state where the rotation of the step plate in the left/right direction is permitted.

The vehicle preferably further includes: first operation means that is operated by the rider to perform a turning movement of the vehicle; and second control means to control a wheel either in a turning mode of the vehicle based on an operation of the first operation means or in a turning mode of the vehicle based on a rotation of the step plate in the left/right direction.

The second control means preferably makes switching to the turning mode of the vehicle based on the operation of the first operation means available when the restriction means is restricting the rotation of the step plate in the left/right direction.

The vehicle preferably further includes second operation means that is operated by the rider to make the restriction means restrict or permit the rotation of the step plate in the left/right direction.

The vehicle preferably further includes a vehicle main body that supports the step plate, wherein the vehicle main body is a parallel linkage capable of rotating in a left/right direction, the parallel linkage including top and bottom horizontal links and left and right vertical links, and a step plate being disposed on an upper end of each of the left and right vertical links, and the restriction means restricts the rotation of the step plate in the left/right direction by restricting a rotation of the vehicle main body.

The restriction means preferably includes a restriction piece that protrudes under control of the first control means, the restriction piece being disposed near a connecting portion between the horizontal link and the vertical link and being configured so that the protruded restriction piece comes into contact with the horizontal link or the vertical link and thereby restricts a rotation of the vehicle main body in a left/right direction.

The vehicle preferably further includes a vehicle main body, the vehicle main body being connected to the step plate through a rotation shaft so as to permit a rotation of the step plate in a left/right direction, wherein the restriction means restricts the rotation of the step plate in the left/right direction by restricting a rotation of the rotation shaft.

Advantageous Effects of Invention

In accordance with the present invention, it is possible to provide a vehicle capable of maintaining a stable state when a rider gets on the step plate or get off the step plate.

DESCRIPTION OF EMBODIMENTS

<First Exemplary Embodiment>

Figure 1:
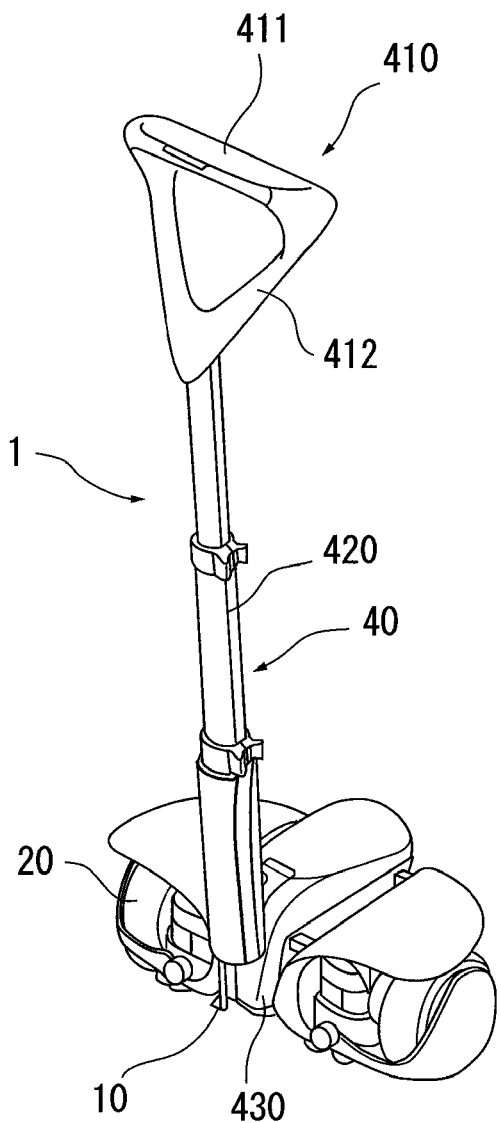
FIG. 1 is a perspective view schematically showing a vehicle of a first exemplary embodiment in accordance with of the present invention.
Figure 2:
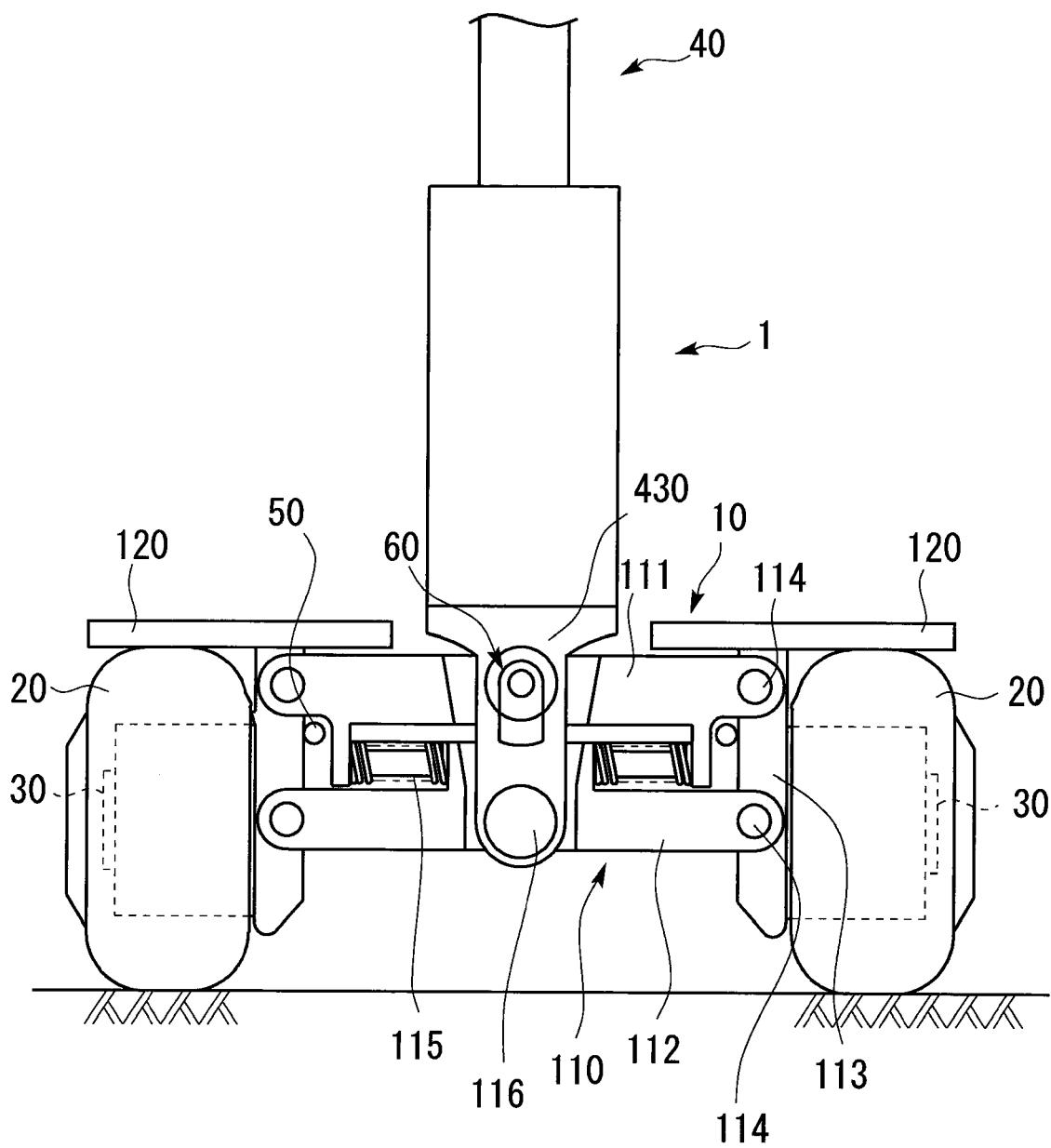
FIG. 2 is a front view showing a configuration of a vehicle body and its surrounding area in a vehicle of a first exemplary embodiment in accordance with the present invention.
Figure 3:
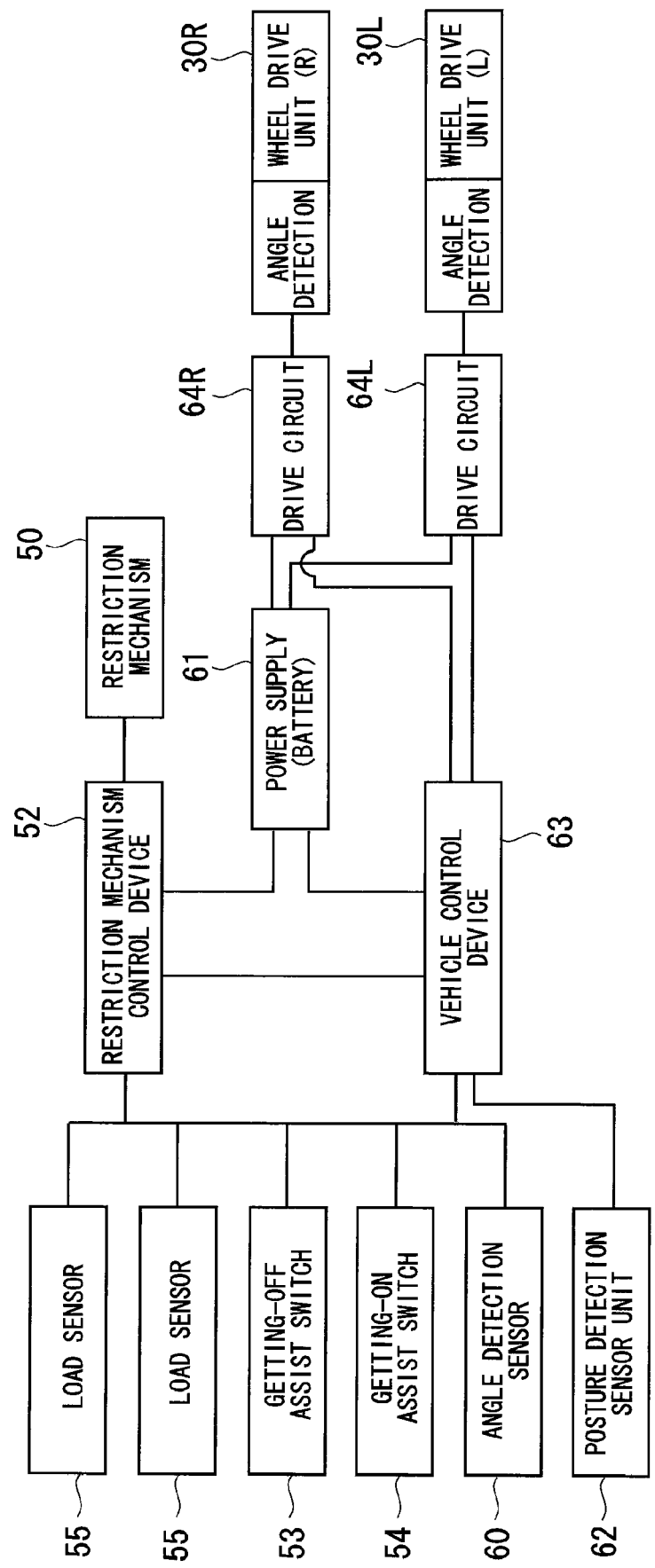
FIG. 3 is a block diagram of a control system in a vehicle of a first exemplary embodiment in accordance with the present invention.

A vehicle according to a first exemplary embodiment in accordance with the present invention is explained with reference to the drawings. As shown in FIGS. 1 to 3, a vehicle 1 includes a vehicle body 10, wheels 20, wheel drive units 30, a support member 40, and a restriction mechanism 50. The vehicle 1 is an inversion-control-type coaxial two-wheel vehicle.

As shown in FIG. 2, the vehicle body 10 includes a parallel linkage 110 and step plates 120. The parallel linkage 110 serves as the vehicle main body. The parallel linkage 110 includes two horizontal links 111 disposed on the upper side, two horizontal links 112 disposed on the lower side, and two vertical links 113 disposed on the left and right sides. A shaft receiving hole is formed in the middle portion in the longitudinal direction of the horizontal link 111. The shaft receiving hole penetrates the horizontal link 111 in the forward/backward direction. A shaft receiving hole that penetrates the horizontal link 111 in the forward/backward direction is also formed in each of the left and right end portions of the horizontal link 111. These two horizontal links 111 are disposed so as to sandwich the upper end portions of the vertical links 113 at both end portions of the two horizontal links 111.

The horizontal links 112 have a similar configuration to that of the horizontal links 111. These two horizontal links 112 are disposed so as to sandwich the lower end portions of the vertical links 113 at both end portions of the two horizontal links 112.

Each of the vertical links 113 is composed of a flat plate member. A shaft receiving hole is formed in each of the upper and lower end portions of the vertical link 113. The shaft receiving hole penetrates the vertical link 113 in the forward/backward direction. These vertical links 113 are disposed between the vertically-arranged two horizontal links 111 and 111 and two horizontal links 112 and 112 at their end portions. Further, the shaft receiving holes of the vertical links 113 are disposed on the same axial centerlines as those of the shaft receiving holes of the horizontal links 111 and 112. Further, turning support pins 114 are inserted in such a manner that they pass through these shaft receiving holes in a reciprocal manner. As a result, the horizontal links 111 and 112 and the vertical links 113 are formed as a parallel linkage that can rotate in the left/right direction of the vehicle 1. Incidentally, the horizontal links 111 and 112 are connected with each other by means of a restoration member 115 such as a spring, so that the parallel linkage 110 is restored from a state where the parallel linkage 110 is rotated in the left/right direction of the vehicle 1 to the original state, that is, so that the vertical links 113 are restored from an inclined parallelogram state to the rectangular state.

The wheel drive units 30 are attached on the exterior surfaces of the vertical links 113. Each of the wheel drive units 30 can be constructed, for example, from an electric motor, a series of reduction gears that are coupled to the rotation axis of the electric motor so that the power can be transferred from the rotation axis to the reduction gears, and the like. Each of the wheel drive units 30 is composed of a fixed portion fixed to the vertical link 113 and a rotating portion that is supported on the fixed portion so that the rotating portion can freely rotate. The wheels 20 are attached to the respective rotating portions. In this way, the left and right wheels 20, which are supported on the respective vertical links 113 through the respective wheel drive units 30, are disposed in such a manner that their rotation centers are aligned on the same axial centerline when the vehicle is placed on a flat road surface.

Figure 4:
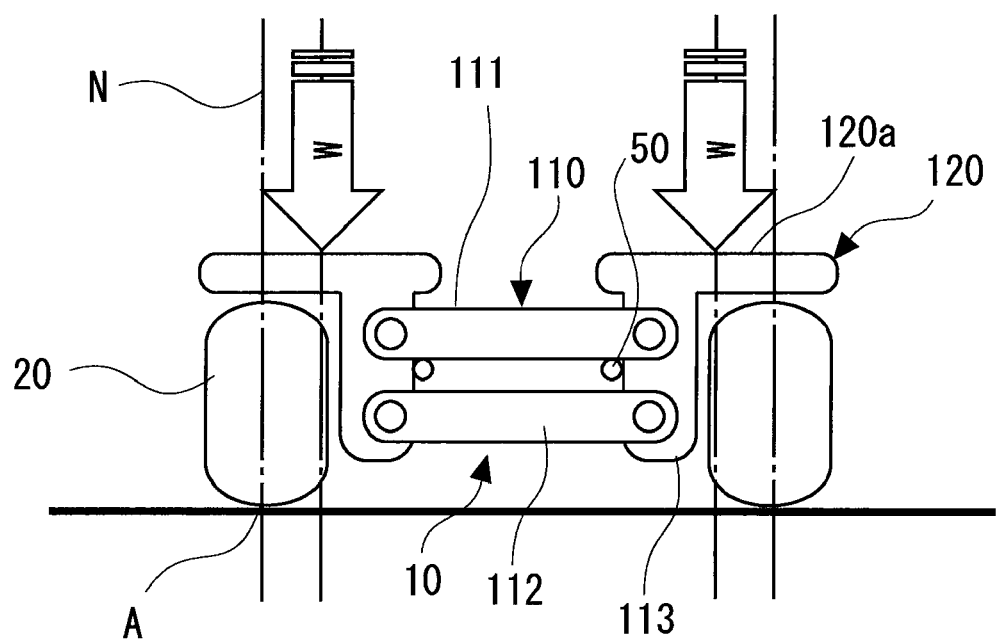
FIG. 4 schematically shows a balanced state of a vehicle main body in a vehicle of a first exemplary embodiment in accordance with the present invention.

Further, the upper end portions of the vertical links 113 protrude upward from the upper surfaces of the horizontal links 111. Step plates 120 are horizontally attached on the upper end surfaces of the respective vertical links 113. Specifically, as shown in FIG. 4, the left and right step plates 120 are disposed on the upper end portions of the vertical links 113 in such a manner that when the left and right feet of a rider are put on the left and right step plates 120, the weight of the rider is exerted on the parallel linkage 110 from points located inside the lines N that pass through the ground-contact points A of the wheels 20 and are parallel to the vertical links 113. In this exemplary embodiment, the left and right step plates 120 have footrest areas 120a inside the respective lines N. As a result, the weight of the rider standing on the footrest areas 120a of the left and right step plates 120 is exerted on the parallel linkage 110 from points located inside the lines N. Incidentally, the distance between the left and right step plates 120 may be equal to a distance between both feet of a human when he/she stands in a natural state.

Figure 5:
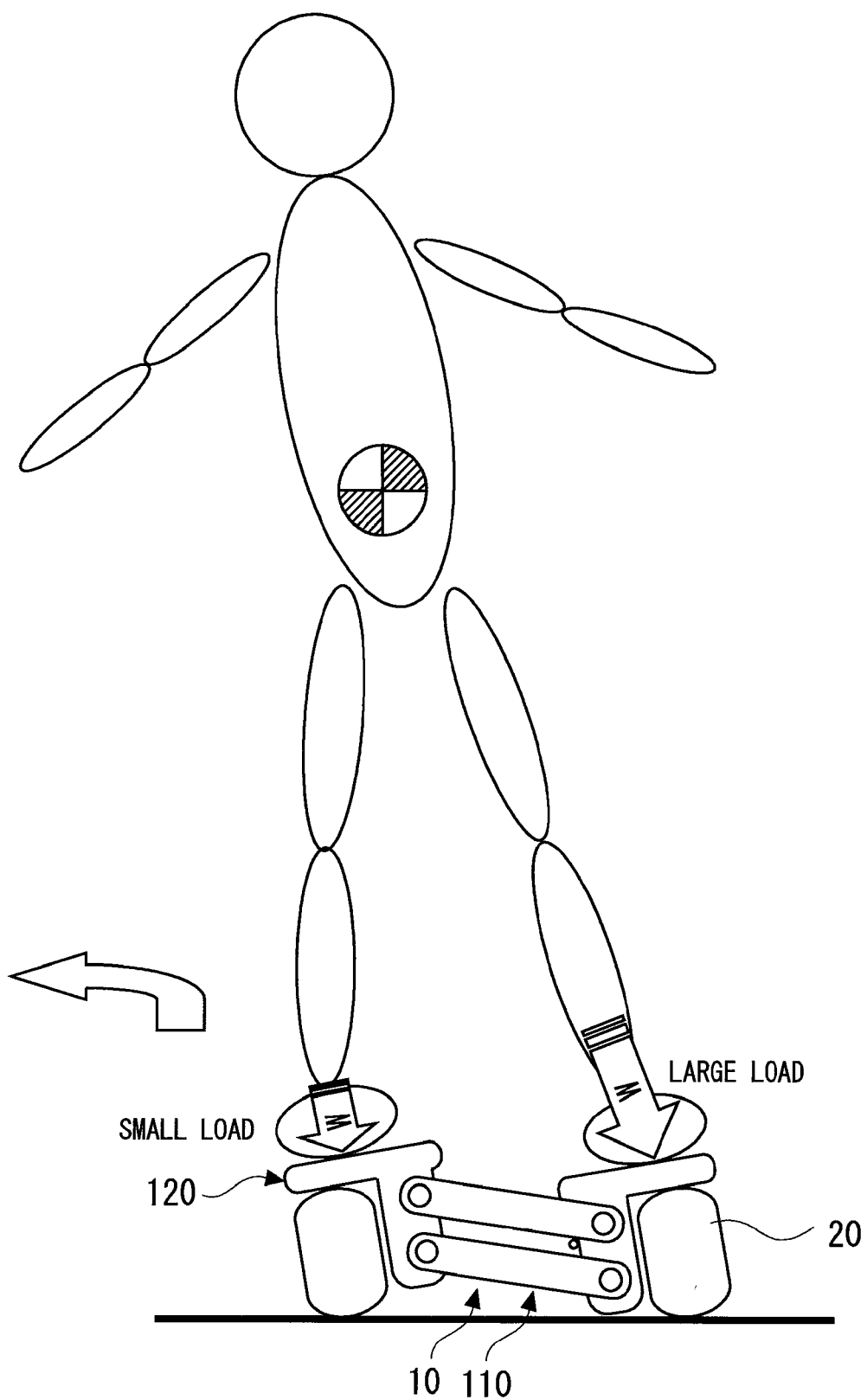
FIG. 5 schematically shows a turning state of a vehicle of a first exemplary embodiment in accordance with the present invention.

As shown in FIG. 4, the parallel linkage 110 like this maintains a balanced state when a rider exerts roughly the same weights on the footrest areas 120a of the left and right step plates 120. In contrast to this, as shown in FIG. 5, when a rider applies a large downward force with his/her foot on the outer side with respect to a turning direction to apply a large weight W on the step plate 120 on that side, a rotational force in the left/right direction is generated in the parallel linkage 110. In this state, the step plates 120 and the wheels 20 are also tilted (rotated) in the left/right direction in conjunction with the rotation of the parallel linkage 110.

The support member 40 includes a handle 410, a handle bar 420, and a handle bar bracket 430.

The handle 410 includes a grip portion 411 having an annular shape as viewed from the top, and a support portion 412 for supporting the grip portion 411 from the rear side. The rider can stabilize his/her posture by grasping the grip portion 411 during traveling and during a getting-on/off action. Further, for example, when a wheel(s) for transportation is provided on the rear surface of the vertical link 113 of the vehicle body 10, the vehicle 1 itself can be transported by tilting the vehicle 1 backward by grasping the grip portion 411 and dragging the vehicle 1 in a state where the vehicle 1 is supported on the wheel for transportation. The lower end portion of the support portion 412 is connected to the handle bar 420. The lower end portion of the handle bar 420 is connected to the upper end portion of the handle bar bracket 430.

The handle bar bracket 430 has such a shape that it straddles the central point of the vehicle body 10 in the forward/backward direction. A front portion is provided in front of the handle bar bracket 430 and extends to the lower portion of the vehicle body 10. Shaft receiving holes are formed in the front portion in such places that they correspond to the central shaft receiving holes of the horizontal links 111 and 112 that are vertically arranged in front of the vertical links 113. The shaft receiving holes in the front portion are disposed on the same axial centerlines as those of the central shaft receiving holes of the horizontal links 111 and 112. A turning support shaft 116 is inserted so as to pass through the shaft receiving holes in a reciprocal manner.

A rear portion is provided behind the handle bar bracket 430 and extends to the lower portion of the vehicle body 10, though its illustration is omitted in the figure. Shaft receiving holes are formed in the rear portion in such places that they correspond to the central shaft receiving holes of the horizontal links 111 and 112 that are vertically arranged behind the vertical links 113. The shaft receiving holes in the rear portion are disposed on the same axial centerlines as those of the shaft receiving holes of the horizontal links 111 and 112. A turning support shaft is inserted so as to pass through the shaft receiving holes in a reciprocal manner. Further, the turning support shafts disposed in the front and rear portions are disposed on the same axial centerline.

When the parallel linkage 110 is rotated in the left/right direction, the support member 40 having the configuration like this is also rotated in conjunction with the rotation of the parallel linkage 110. That is, the support member 40 is maintained in parallel with the vertical links 113 of the parallel linkage 110.

To detect the rotation angle (tilting angle) of this support member 40, an angle detection sensor (first detection unit) 60 is provided in the connecting portion between the parallel linkage 110 and the handle bar bracket 430. As the angle detection sensor 60, for example, a potentiometer, a sensor having a variable-capacitor structure, or the like can be used. This angle detection sensor 60 can detect the tilting angle of the handle bar bracket 430 with respect to the horizontal links 111 of the parallel linkage 110 by using a feature that the electrical resistance of the angle detection sensor 60 varies according to the amount of rotational displacement.

Incidentally, in the vehicle 1 shown in FIG. 1, a storage portion is formed in an area between the left and right step plates 120 and between the front and rear horizontal links 111 and 111 and the front and rear horizontal links 112 and 112. In this storage portion, a battery 61, which is a specific example of the power supply to supply an electrical power to the left and right wheel drive units 30, the control device, and other electronic devices and electric devices, is stored. Further, a drive circuit that drives the left and right wheel drive units 30 and the like, a posture detection sensor unit 62 that is posture detection means to detect the posture of the vehicle 1 and to output the detection signal, and a vehicle control device (second control unit) 63 that outputs control signals used to control the driving of the left and right wheel drive units 30 and the like are also stored in the storage portion. Since the heavy objects including the battery 61 are collectively stored in a place directly below the rider who stands on the left and right step plates 120, the concentration of the mass can be achieved and the operatively of the vehicle can be thereby improved.

As shown in FIG. 3, the vehicle control device 63 performs predetermined arithmetic processing based on a detection signal from the posture detection sensor unit 62, a detection signal from the angle detection sensor 60, and the like, and outputs necessary control signals to the left and right wheel drive units 30 (30L and 30R) and the like. The vehicle control device 63 includes, for example, an arithmetic circuit having a micro computer (CPU), a storage device having a program memory, a data memory, other RAMs and ROMs, and the like. The battery 61 and the left and right drive circuits 64 (64L and 64R) are connected to the vehicle control device 63. The left and right drive circuits 64 (64L and 64R) individually control the rotation speeds, the rotation directions, and the like of the respective left and right wheels 20. The left and right wheel drive units 30 (30L and 30R) are individually connected to the respective left and right drive circuits 64L and 64R.

A detection signal from the angle detection sensor 60 that detects the tilting angle of the support member 40 and a detection signal from the posture detection sensor unit 62 are input to the vehicle control device 63. The posture detection sensor unit 62 is used to detect the angle and/or the angular speed of the vehicle 1 in the forward/backward direction and thereby to control the angle, the angular speed, and/or the acceleration of the vehicle 1 in the forward/backward direction. The posture detection sensor unit 62 includes, for example, a gyroscopic sensor and an acceleration sensor.

In the vehicle 1 having the configuration like this, a rider gets on the step plates 120 and applies a large downward force with his/her foot on the outer side with respect to a turning direction to apply a weight on the step plate 120. As a result, the parallel linkage 110 rotates to the left or right while maintaining the parallel state of the opposed links. At the same time, the support member 40 also rotates to the left and right in conjunction with the parallel linkage 110. In this state, the angle detection sensor 60 detects the tilting angle of the support member 40 with respect to the horizontal links 111 and 112, and outputs the detection signal to the vehicle control device 63. Upon receiving the detection signal, the vehicle control device 63 performs predetermined arithmetic processing based on the detection signal, calculates how much the rotation speed of the wheel on the inner side with respect to the turning direction should be decreased or how much the rotation speed of the wheel on the outer side with respect to the turning direction should be increased, and outputs a signal indicating the calculation result to the wheel drive unit 30. Upon receiving the signal indicating the calculation result, the wheel drive unit 30 controls the rotation speed of the motor and thereby drives the wheel 20 based on the signal indicating the calculation result. In this way, the vehicle 1 is controlled for its turning movement.

Further, in the vehicle 1, the rider gets on the left and right step plates 120, and shifts his/her weight forward or backward to tilt the vehicle 1 forward or backward. As a result, the posture detection sensor unit 62 detects the forward or backward angle and/or the angular speed of the vehicle 1 and outputs the detection signal to the vehicle control device 63. Upon receiving the detection signal, the vehicle control device 63 performs predetermined arithmetic processing based on the detection signal, calculates a drive torque necessary to stabilize the vehicle 1 so that the vehicle 1 does not topple over, and outputs a signal indicating the calculation result to the wheel drive units 30. Upon receiving the signal indicating the calculation result, the wheel drive units 30 controls the rotation speed of the motors and thereby drives the wheels 20 based on the signal indicating the calculation result. In this way, the vehicle 1 is controlled for its inverted state.

In the vehicle 1 having the configuration like this, when a rider applies a large downward force with his/her foot on the outer side with respect to a turning direction to actively change the weight distribution, the parallel linkage 110 constituting the vehicle body 10, the step plates 120, and the wheels 20 work together and tilt to the left or right. As a result, the vehicle 1 including the rider works as one piece, thus enabling the rider to enjoy operating the vehicle 1. In addition, the vehicle 1 can be brought into a state where the rider can easily cope with centrifugal force during the turning movement. However, when a rider takes such a posture that only one foot is on the step plate 120 as the rider tries to get on/off the vehicle 1, the step plates 120 could be tilted. Thus, the vehicle 1 becomes unstable state.

Figure 6:
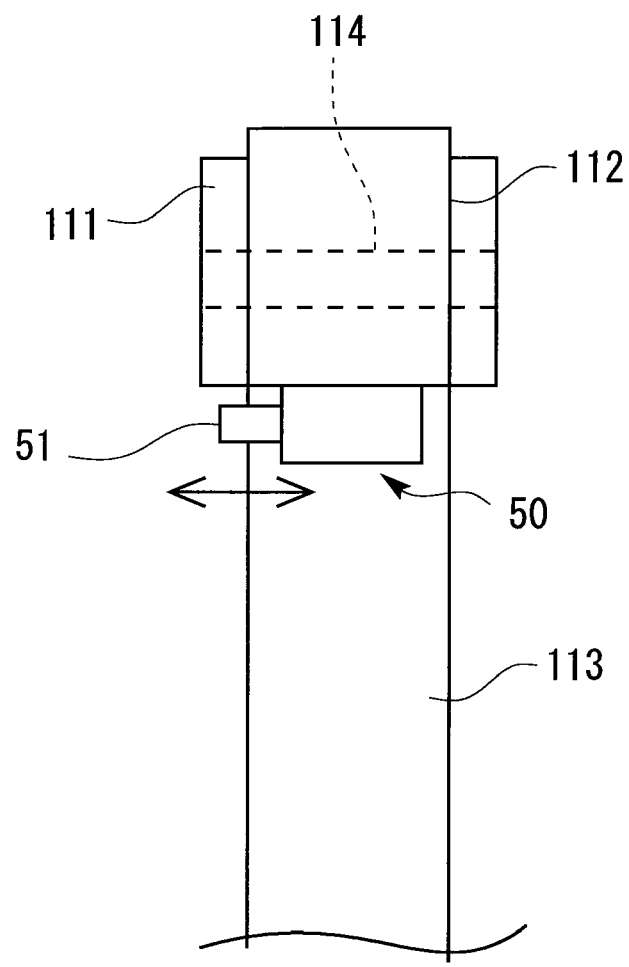
FIG. 6 schematically shows a restriction mechanism.

Accordingly, the vehicle 1 in accordance with the present invention includes a restriction mechanism 50 to allow the tilting movement of the step plates 120 in the left/right direction to be restricted. As the restriction mechanism 50, for example, a translational actuator or the like can be used. That is, as shown in FIG. 6, the restriction mechanism 50 translates a restriction piece 51 by using the driving force of a solenoid or the like. However, the restriction mechanism 50 is not limited to any particular configurations, provided that it can push out or pull in the restriction piece 51.

The restriction mechanism 50 is disposed near the connecting portion between the horizontal link 111 and the vertical link 113 in the parallel linkage 110. That is, as shown in FIGS. 2 and 4, the restriction mechanism 50 is disposed in an area close to the connecting portion on the inner surface of the left and right vertical links 113. In this state, by pushing out the restriction pieces 51, the restriction pieces 51 come into contact with the lower surface of the horizontal link 111 when the parallel linkage 110 starts to rotate. To be more precise, the restriction piece 51 come into contact with the lower surface of the horizontal link 111 at the end portion of the horizontal link 111 located on the opposite side with respect to the rotation direction of the parallel linkage 110. Therefore, when the restriction pieces 51 are pushed out, the rotation of the parallel linkage 110 in the left/right direction is restricted, thereby restricting the tilting movement of the step plates 120 in the left/right direction. The restriction mechanism 50 is controlled by a restriction mechanism control device (first control unit) 52. Note that the position of the restriction mechanism 50 is not limited to the above-described example. That is, the restriction mechanism 50 may be disposed in any place where the restriction mechanism 50 can restrict the rotation of the parallel linkage 110.

The restriction mechanism control device 52 also includes, for example, an arithmetic circuit having a micro computer (CPU), a storage device having a program memory, a data memory, other RAMs and ROMs, and the like. The restriction mechanism control device 52 controls the restriction mechanism 50 so that the tilting movement of the step plates 120 in the left/right direction is restricted when a rider gets on the step plates 120 or gets off the step plates 120.

Specifically, a getting-off assist signal for the restriction mechanism control device 52 is supplied from a getting-off assist switch 53 to the restriction mechanism control device 52. The getting-off assist switch 53 is operated by a rider when the rider gets off the vehicle 1. The getting-off assist switch 53 is disposed, for example, in the handle 410 of the support member 40.

A getting-on assist signal for the restriction mechanism control device 52 is supplied from a getting-on assist switch 54 to the restriction mechanism control device 52. The getting-on assist switch 54 is operated by a user when the user gets on the vehicle 1. The getting-on assist switch 54 is disposed, for example, in the handle 410 of the support member 40.

A load exerted on the step plates 120 is input from a load sensor (second detection unit) 55 to the restriction mechanism control device 52. The load sensor 55 detects a load exerted on the step plates 120. A load sensor 55 is disposed in roughly the same place in each of the left and right step plates 120.

The tilting angle of the support member 40 is input from the angle detection sensor 60 to the restriction mechanism control device 52.

The restriction mechanism control device 52 having the configuration like this starts getting-off assist control when a rider operates the getting-off assist switch 53 and a getting-off assist signal is thereby supplied from the getting-off assist switch 53 to the restriction mechanism control device 52. At this point, the restriction pieces 51 of the restriction mechanism 50 are in a retracted state, and therefore the tilting movement of the step plates 120 in the left/right direction is permitted.

The restriction mechanism control device 52 determines whether the parallel linkage 110 is in a roughly non-rotated state or not, i.e., whether the parallel linkage 110 is in a roughly balanced state or not based on the tilting angle of the support member 40. When the tilting angle of the support member 40 is roughly zero degrees, the restriction mechanism control device 52 determines that the parallel linkage 110 is in a roughly balanced state. Therefore, the restriction mechanism control device 52 controls the restriction mechanism 50 so as to push out the restriction pieces 51.

Note that the tilting angle of the support member 40 is substantially equal to the tilting angle of the vertical links 113 of the parallel linkage 110. Further, the tilting angle of the vertical links 113 is substantially equal to the tilting angle of the step plates 120. Therefore, the determination whether the parallel linkage 110 is in a roughly balanced state or not that is made based on the tilting angle of the support member 40 is equivalent to the determination whether the step plates 120 are in a roughly horizontal state or not that is made based on the tilting angle of the step plate 120.

The restriction mechanism control device 52 determines whether the rider has gotten off the vehicle or not based on the load exerted on the left and right step plates 120. When no load is exerted on the left and right step plates 120, the restriction mechanism control device 52 determines that the rider has gotten off the vehicle and thereby finishes the getting-off assist control while maintaining the restriction pieces 51 in the pushed-out state. As a result, the step plates 120 are restricted from tilting to the left or right.

Further, the restriction mechanism control device 52 starts getting-on assist control when a rider operates the getting-on assist switch 54 and a getting-on assist signal is thereby supplied from the getting-on assist switch 54 to the restriction mechanism control device 52. At this point, the restriction mechanism control device 52 had finished the getting-off assist control with the restriction pieces 51 being in the pushed-out state as described above. Therefore, at this point, the pushed-out state is maintained and the step plates 120 are thereby restricted from tilting to the left or right.

The restriction mechanism control device 52 determines whether or not the rider is riding on the vehicle in such a manner that roughly the same loads are exerted on the left and right step plates 120 based on the loads exerted on the left and right step plates 120. When roughly the same loads are exerted on the left and right step plates 120, the restriction mechanism control device 52 determines that the rider is riding on the vehicle in such a manner that roughly the same loads are exerted on the left and right step plates 120. Therefore, the restriction mechanism control device 52 pulls in the restriction pieces 51 to finish the getting-on assist control. As a result, the step plates 120 are permitted to tilt to the left and right. Therefore, as shown in FIG. 5, the rider can turn the vehicle 1 based on the tilting movement of the step plates 120 in the left/right direction.

In the vehicle 1 having the configuration like this, when a rider gets on the step plates 120 or gets off the step plates 120, the tilting movement of the step plates 120 in the left/right direction is restricted by the restriction mechanism 50. Therefore, the rider can get on or get off the vehicle 1 in a stable state.

Incidentally, the control of the restriction mechanism 50 is preferably combined with the turning control and the inversion control of the vehicle 1 as shown below. In this case, as shown in FIG. 3, the getting-off assist signal from the getting-off assist switch 53, the getting-on assist signal from the getting-on assist switch 54, and the load exerted on the step plates 120 and detected by the load sensor 55 are also input to the vehicle control device 63 in addition to the restriction mechanism control device 52.

Figure 7:
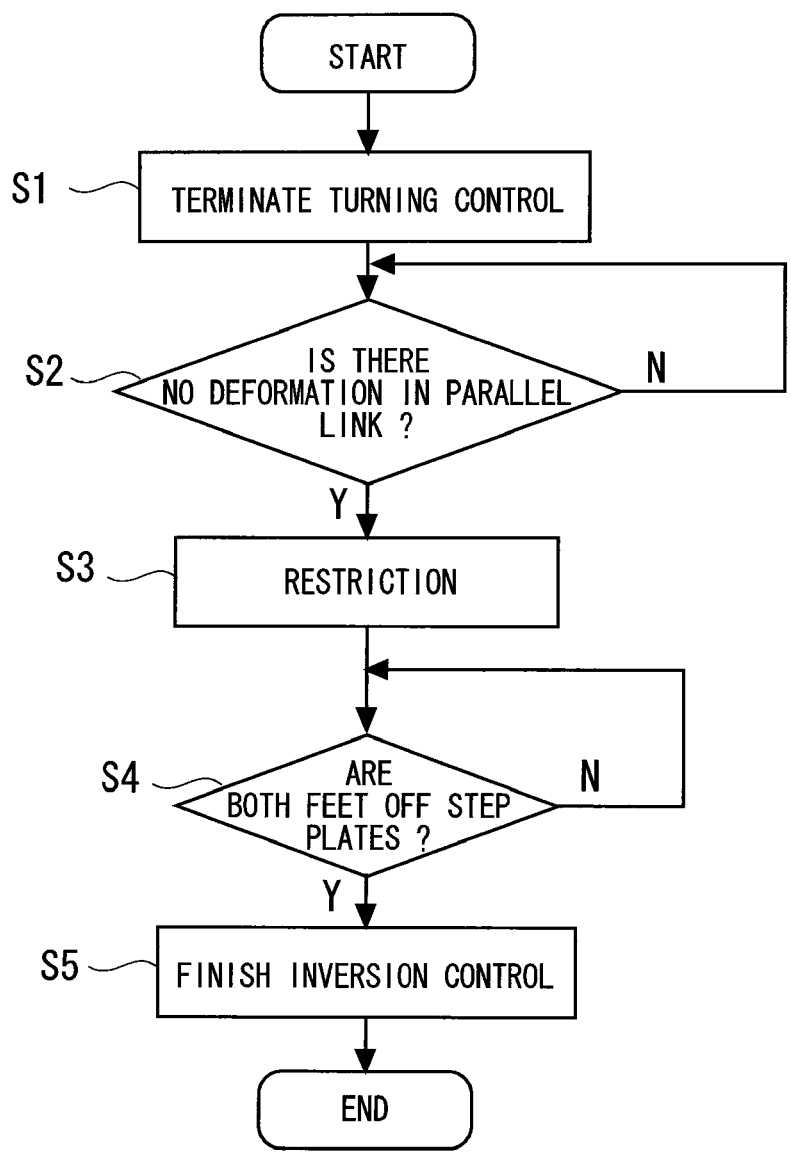
FIG. 7 is a flowchart showing a flow of getting-off assist control of a vehicle of a first exemplary embodiment in accordance with the present invention.

Firstly, a getting-off assist control performed when a rider gets off the vehicle 1 is explained with reference to FIG. 7.

When the rider operates the getting-off assist switch 53, a getting-off assist signal is supplied from the getting-off assist switch 53 to the vehicle control device 63 and the restriction mechanism control device 52. As a result, the vehicle control device 63 and the restriction mechanism control device 52 start getting-off assist control. Upon receiving the getting-off assist signal, the vehicle control device 63 terminates the turning control among the above-described turning control and inversion control (S1).

Upon receiving the getting-off assist signal, the restriction mechanism control device 52 determines whether the parallel linkage 110 is in a roughly balanced state or not based on the tilting angle of the support member 40 detected by the angle detection sensor 60 (S2).

When the restriction mechanism control device 52 determines that the parallel linkage 110 is in a roughly balanced state, the restriction mechanism control device 52 controls the restriction mechanism 50 so as to push out the restriction pieces 51 and thereby to restrict the tilting movement of the step plates 120 in the left/right direction (S3). As described above, the restriction mechanism control device 52 confirms that the parallel linkage 110 is in a roughly balanced state. Therefore, the rotation of the parallel linkage 110 in the left/right direction can be reliably restricted when the restriction pieces 51 are pushed out.

The restriction mechanism control device 52 determines whether the rider has gotten off the vehicle or not base on the load exerted on the left and right step plates 120 that is detected by the load sensor 55 (S4). When no load is exerted on the left and right step plates 120, the restriction mechanism control device 52 determines that the rider has gotten off the vehicle and thereby finishes the getting-off assist control of the restriction mechanism control device 52 while maintaining the restriction pieces 51 in the pushed-out state. Then, the restriction mechanism control device 52 outputs a signal indicating that the getting-off assist control has finished to the vehicle control device 63. Upon receiving the signal indicating that the getting-off assist control of the restriction mechanism control device 52 has finished, the vehicle control device 63 finishes the inversion control and finishes the getting-off assist control of the vehicle control device 63 (S5). In this way, the getting-off assist control of the vehicle 1 has finished.

As described above, since the tilting movement of the left and right step plates 120 in the left/right direction is restricted when a rider gets off the vehicle 1, the rider can get off the vehicle 1 in a stable state.

Figure 8:
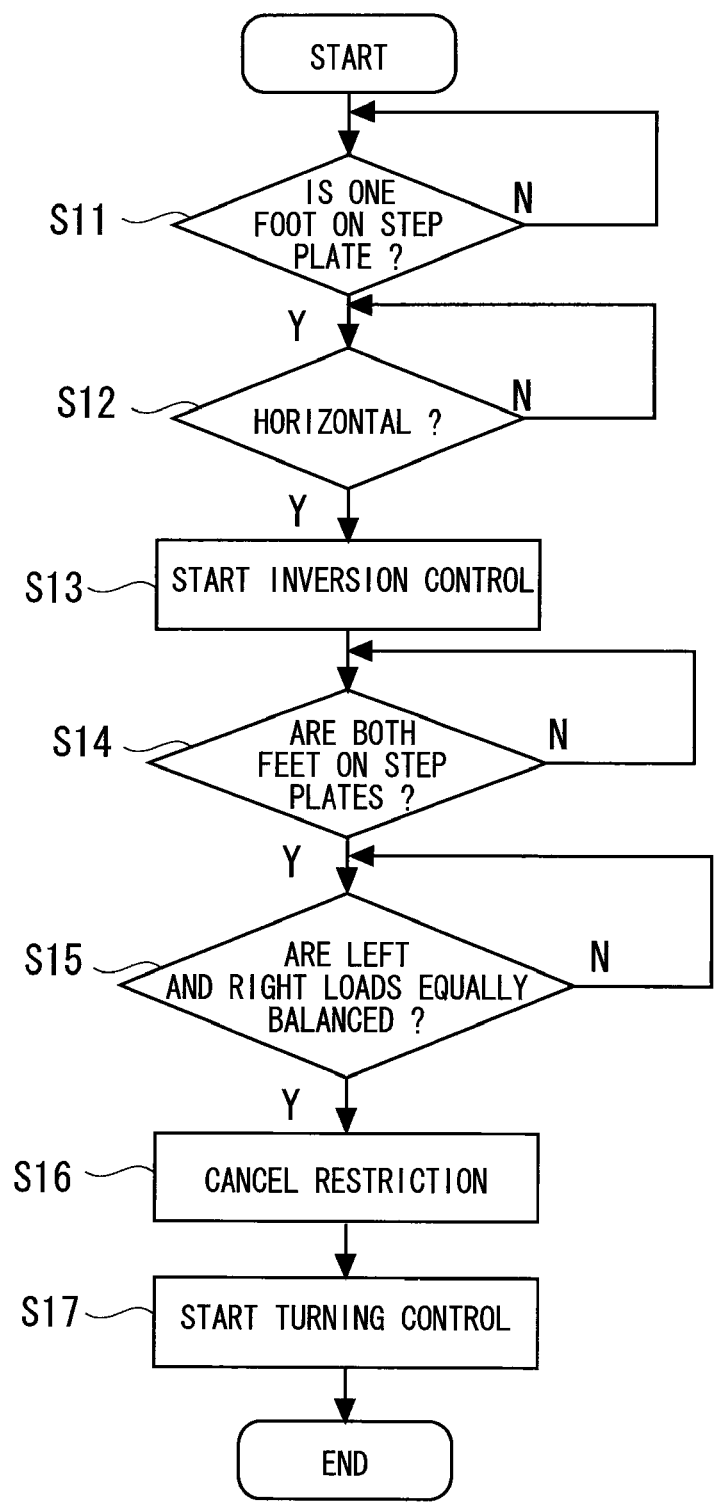
FIG. 8 is a flowchart showing a flow of getting-on assist control of a vehicle of a first exemplary embodiment in accordance with the present invention.

Next, a getting-on assist control performed when a rider gets on the vehicle 1 is explained with reference to FIG. 8.

When the rider operates the getting-on assist switch 54, a getting-on assist signal is supplied from the getting-on assist switch 54 to the vehicle control device 63 and the restriction mechanism control device 52. As a result, the vehicle control device 63 and the restriction mechanism control device 52 start getting-on assist control. Upon receiving the getting-on assist signal, the vehicle control device 63 determines whether a foot is put on at least one of the step plates 120 or not based on the load exerted on the step plates 120 and detected by the load sensor 55 (S11).

When the vehicle control device 63 determines that a foot is put on at least one of the step plates 120, the vehicle control device 63 determines whether the vehicle 1 is in a roughly horizontal state in the forward/backward direction or not based on the angle and the angular speed of the vehicle 1 in the forward/backward direction that is detected by the posture detection sensor unit 62 (S12).

When the vehicle control device 63 determines that the vehicle 1 is in a roughly horizontal state in the forward/backward direction, the vehicle control device 63 starts inversion control (S13). Then, the vehicle control device 63 outputs a signal indicating the start of the inversion control to the restriction mechanism control device 52.

Upon receiving the signal indicating the start of the inversion control, the restriction mechanism control device 52 determines whether the feet of the rider are put on the left and right step plates 120 based on the load exerted on the left and right step plates 120 and detected by the load sensor 55 (S14).

When the restriction mechanism control device 52 determines that the feet of the rider are put on the left and right step plates 120, the restriction mechanism control device 52 further determines whether or not the rider is riding on the vehicle in such a manner that roughly the same loads are exerted on the left and right step plates 120 based on the loads exerted on the left and right step plates 120 and detected by the load sensor 55 (S15).

When the restriction mechanism control device 52 determines that the rider is riding on the vehicle in such a manner that roughly the same loads are exerted on the left and right step plates 120, the restriction mechanism control device 52 controls the restriction mechanism 50 so as to pull in the restriction pieces 51 and thereby to permit the tilting movement of the left and right step plates 120 in the left/right direction. Then, the restriction mechanism control device 52 finishes the getting-on assist control of the restriction mechanism control device 52 (S16).

The restriction mechanism control device 52 outputs a signal indicating that the getting-on assist control has finished to the vehicle control device 63. Upon receiving the signal indicating that the getting-on assist control has finished, the vehicle control device 63 starts turning control and finishes the getting-on assist control of the vehicle control device 63 (S17). In this way, the getting-on assist control of the vehicle 1 has finished.

As described above, since the tilting movement of the left and right step plates 120 in the left/right direction is restricted when a rider gets on the vehicle 1, the rider can get on the vehicle 1 in a stable state. In addition, the vehicle control device 63 starts the turning control after the vehicle control device 63 confirmed that the rider is riding on the vehicle in such a manner that roughly the same loads are exerted on the left and right step plates 120. Therefore, it is possible to prevent such a situation that the vehicle accidentally turns to an unintended direction as the rider tries to get on/off the vehicle 1. Further, since the restriction is cancelled after the restriction mechanism control device 52 confirmed that the left and right loads are equal to each other, it is also possible to prevent such a situation that the vehicle accidentally inclines to the left or right at the moment when the restriction is cancelled.

Figure 9:
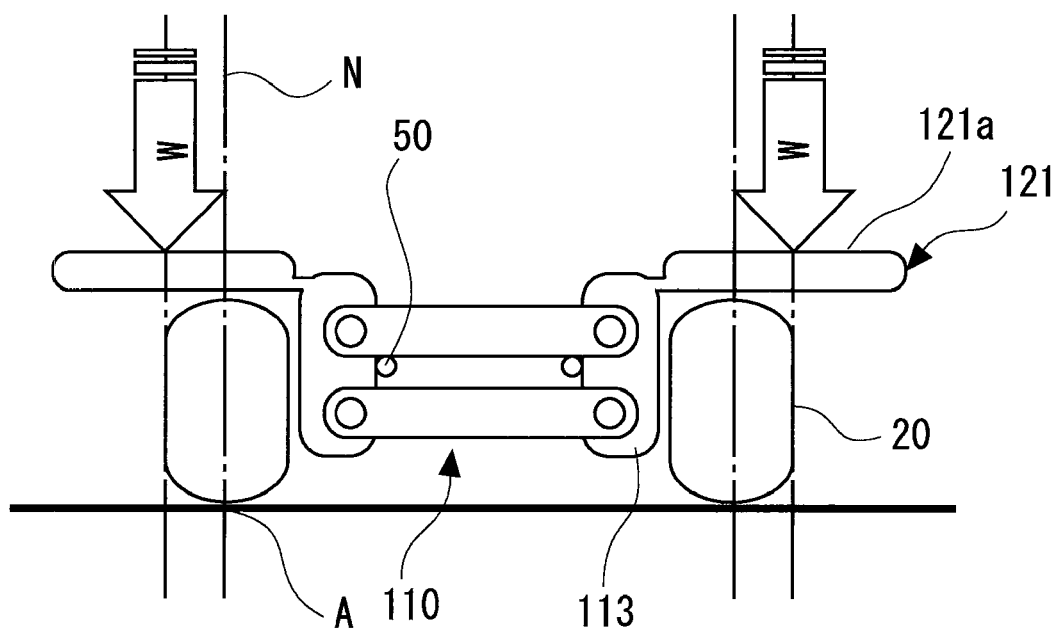
FIG. 9 schematically shows a balanced state of a vehicle main body in another vehicle of a first exemplary embodiment in accordance with the present invention.
Figure 10:
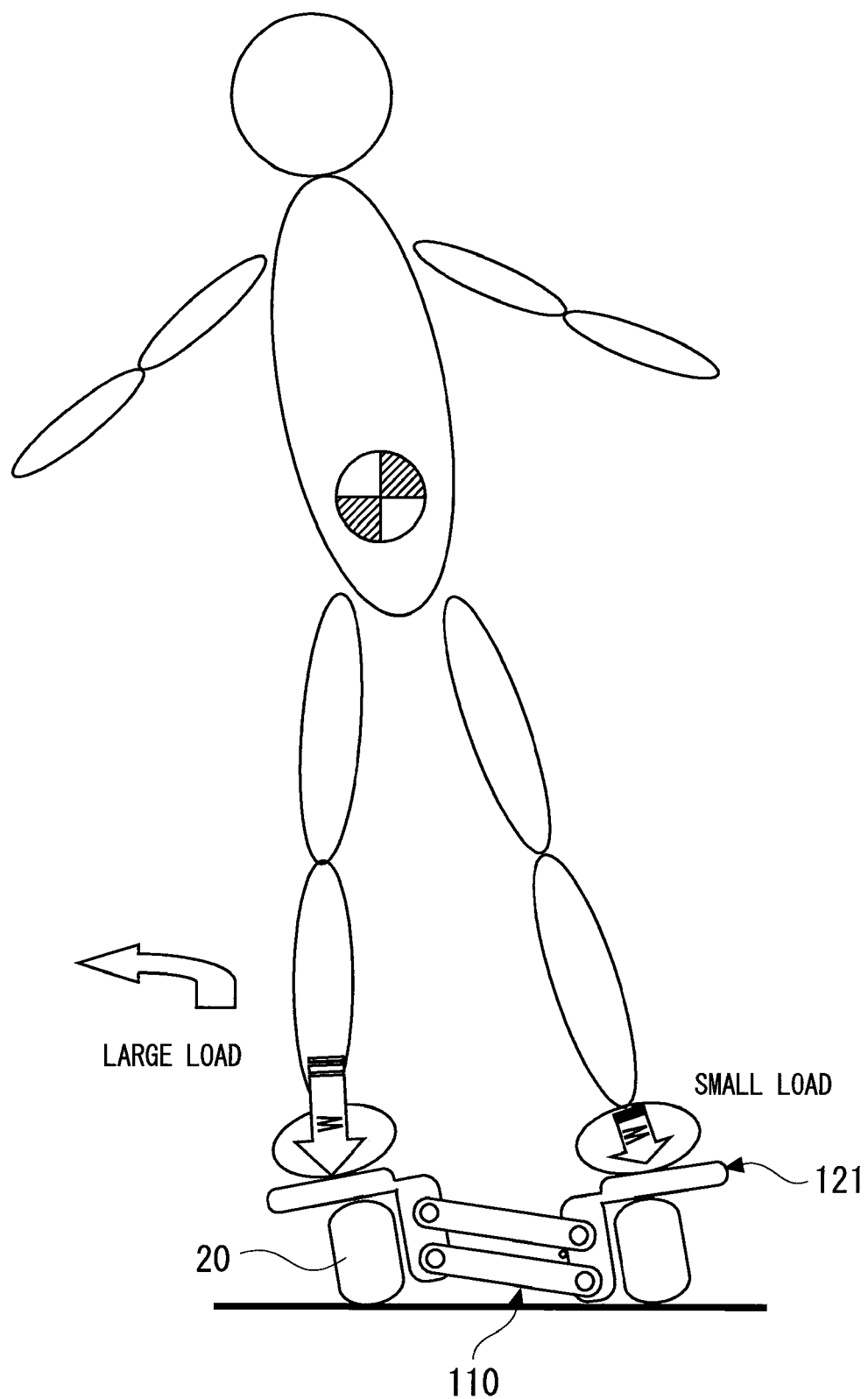
FIG. 10 schematically shows a turning state of another vehicle of a first exemplary embodiment in accordance with the present invention.

Note that although the vehicle 1 in accordance with this exemplary embodiment has such a configuration that the rider applies a large downward force with his/her foot on the outer side with respect to a turning direction to turn the vehicle, it is also possible to employ such a configuration that the rider applies a large downward force with his/her foot on the inner side with respect to a turning direction to turn the vehicle as shown in FIGS. 9 and 10. In such a case, as shown in FIG. 9, the feet of the rider are put on places that are located outside the lines N that pass through the ground-contact points A of the wheels 20 and are parallel to the vertical links 113.

<Second Exemplary Embodiment>

A vehicle according to a second exemplary embodiment in accordance with the present invention is explained with reference to the drawings. Note that part of the explanation that overlaps that of the first exemplary embodiment is omitted.

Figure 11:
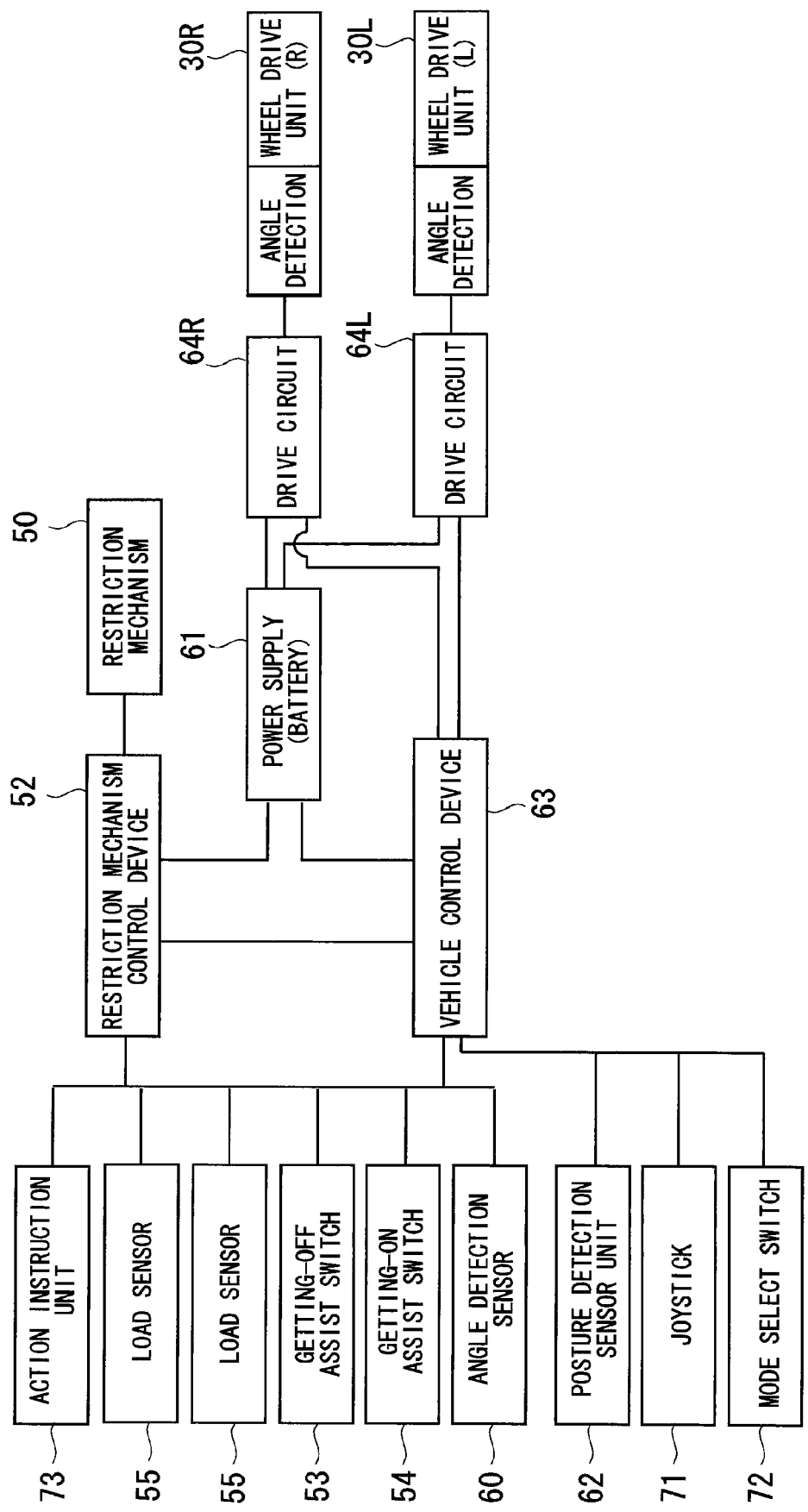
FIG. 11 is a block diagram of a control system in a vehicle of a second exemplary embodiment in accordance with the present invention.

The configuration of a vehicle in accordance with this exemplary embodiment is roughly the same as that of the vehicle 1 in accordance with the first exemplary embodiment. However, as shown in FIG. 11, the vehicle in accordance with this exemplary embodiment further includes a joystick (first operation unit) 71 and a mode select switch 72. The joystick 71 is operated by a rider to instruct the vehicle to perform a turning movement. The joystick 71 is disposed, for example, in the handle 410 of the support member 40. As the joystick 71, any joystick having a typical configuration can be used. When a rider tilts the lever to the left or right, an amount of the tilting movement (operation signal) is output to the vehicle control device 63. Note that although a joystick is used in this exemplary embodiment, other operating devices such as dial-type devices may be also used.

The mode select switch 72 is operated by a rider to switch the vehicle between a turning mode based on an operation by the joystick 71 and another turning mode based on the tilting movement of the step plates 120 in the left/right direction. The mode select switch 72 is disposed, for example, in the handle 410 of the support member 40. When the rider operates the mode select switch 72, a select signal is output to the vehicle control device 63. Note that although the tuning mode is switched by using the mode select switch 72 in this exemplary embodiment, the mode select switch 72 may be omitted. In such a case, when the vehicle control device 63 receives an operation signal from the joystick 71, the vehicle control device 63 brings the vehicle into the turning mode based on the operation by the joystick 71.

The vehicle control device 63 has a turning mode of the vehicle based on an operation by the joystick 71 and another turning mode of the vehicle based on the tilting movement of the step plates 120 in the left/right direction. The vehicle control device 63 selects either one of the turning mode of the vehicle based on an operation by the joystick 71 and the other turning mode of vehicle based on the tilting movement of the step plates 120 in the left/right direction based on a select signal supplied from the mode select switch 72, and controls the wheels 20 in the selected turning mode. With this configuration, the rider can select the turning mode of the vehicle based on an operation by the joystick 71 or the turning mode of vehicle based on the tilting movement of the step plates 120 in the left/right direction as appropriate depending on the usage and/or the place of the vehicle. Needless to say, the rider can get on or get off the vehicle in a stable state by operating the getting-off assist switch 53 and the getting-on assist switch 54 as with the first exemplary embodiment.

It is preferable that the vehicle control device 63 allows the vehicle to be switched to the turning mode based on the operation by the joystick 71 only when the restriction mechanism 50 is restricting the tilting movement of the step plates 120 in the left/right direction. With this configuration, the step plates 120 always become a roughly horizontal state before the vehicle is switched to the turning mode based on the operation by the joystick 71. Therefore, the operability of the vehicle can be improved.

It is also preferable that vehicle includes an action instruction unit (second operation unit) 73 that controls the push-out action or the pull-in action of the restriction pieces 51 of the restriction mechanism 50, so that the rider can easily change the turning mode while the vehicle is traveling. The action instruction unit 73 is disposed, for example, in the handle 410 of the support member 40. When the rider operates the action instruction unit 73, the action instruction unit 73 outputs an action instruction signal to the restriction mechanism control device 52 to instruct the restriction mechanism 50 to push out or pull in the restriction pieces 51.

When the restriction mechanism control device 52 receives an action instruction signal to instruct the restriction mechanism 50 to push out the restriction pieces 51, it determines whether the parallel linkage 110 is in a roughly balanced state or not based on the tilting angle of the support member 40 detected by the angle detection sensor 60. Further, when the restriction mechanism control device 52 determines that the parallel linkage 110 is in a roughly balanced state, the restriction mechanism control device 52 pushes out the restriction pieces 51 based on the action instruction signal to restrict the tilting movement of the step plates 120 in the left/right direction. At the same time, the restriction mechanism control device 52 outputs a signal indicating that the restriction piece 51 is in a pushed-out state to the vehicle control device 63.

Further, when the restriction mechanism control device 52 receives an action instruction signal to instruct the restriction mechanism 50 to pull in the restriction pieces 51, it determines whether or not the rider is riding on the vehicle in such a manner that roughly the same loads are exerted on the left and right step plates 120 based on the loads exerted on the left and right step plates 120 and detected by the load sensor 55.

When the restriction mechanism control device 52 determines that the rider is riding on the vehicle in such a manner that roughly the same loads are exerted on the left and right step plates 120, the restriction mechanism control device 52 pulls in the restriction pieces 51 based on the action instruction signal.

In this way, a rider can restrict or permit the tilting movement of the step plates 120 in the left/right direction by operating the action instruction unit 73 even when the vehicle is traveling. Therefore, the rider can switch the turning mode in a stable state even when the vehicle is traveling.

<Third Exemplary Embodiment>

A vehicle according to a third exemplary embodiment in accordance with the present invention is explained with reference to the drawings. Note that part of the explanation that overlaps that of the first or second exemplary embodiment is omitted.

Figure 12:
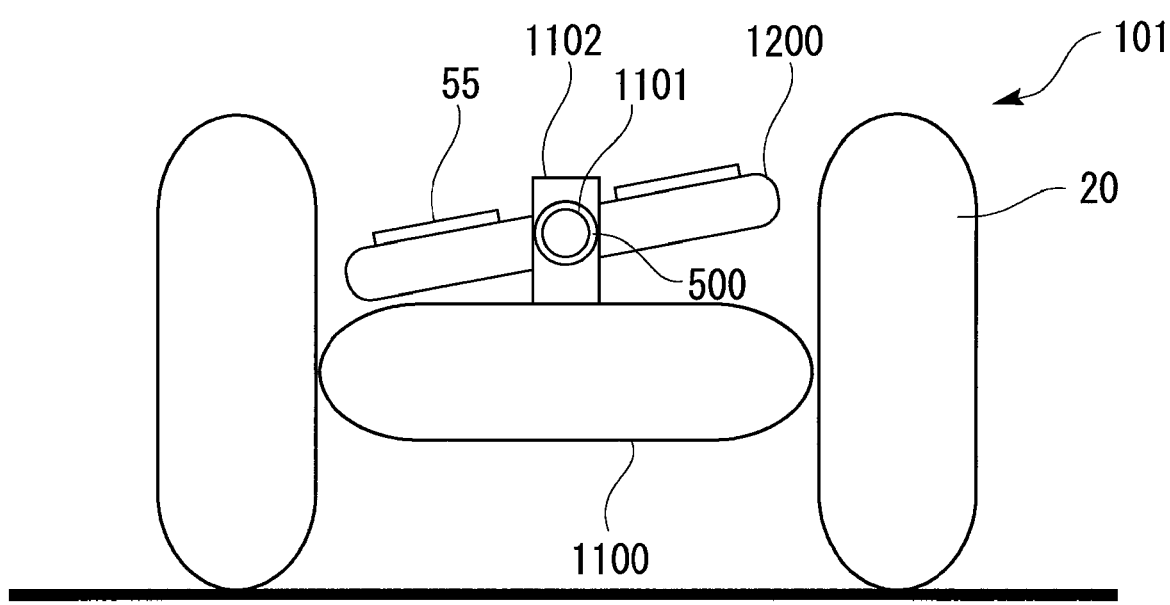
FIG. 12 is a front view showing a configuration of a vehicle body and its surrounding area in a vehicle of a third exemplary embodiment in accordance with the present invention.

The fundamental configuration of a vehicle 101 in accordance with this exemplary embodiment is the same as that of the vehicle in accordance with the first or second exemplary embodiment. However, as shown in FIG. 12, a step plate 1200 is connected to a vehicle main body 1100 through a rotation shaft 1101. The vehicle main body 1100 serves as a housing in which, for example, the vehicle control device 63, the restriction mechanism control device 52, and the battery 61 are stored. The wheels 20 are connected to the vehicle main body 1100 through drive units. On the upper surface of the vehicle main body 1100, jigs 1102 protrude from roughly the center in the left/right direction. At least two jigs 1102 are disposed with a space therebetween in the forward/backward direction. A rotation shaft 1101 disposed in the forward/backward direction of the vehicle main body 1100 passes through the jigs 1102.

The rotation of the rotation shaft 1101 is restricted by a restriction mechanism 500. As the restriction mechanism 500, for example, a magnetic brake can be used. However, any configuration capable of restricting the rotation of the rotation shaft 1101 can be used as the restriction mechanism 500. Similarly to the first exemplary embodiment and the like, the restriction mechanism 500 is controlled by a restriction mechanism control device. The step plate 1200 is connected to the vehicle main body 1100 through this rotation shaft 1101 in such a manner that the step plate 1200 can tilt in the left/right direction.

The step plate 1200 is formed as one plate member. The step plate 1200 is connected to the vehicle main body 1100 through the rotation shaft 1101. Load sensors 55 are disposed on the left and right sides on the upper surface of the step plate 1200.

With the configuration like this, this exemplary embodiment can be implemented in roughly the same fashion as that of the first and second exemplary embodiments even though the step plate is formed as one plate member. Note that although the tilting movement of the step plate 1200 is restricted by restricting the rotation of the rotation shaft 1101 in this exemplary embodiment, it is not limited to this configuration. That is, translational actuators may be disposed on the left and right sides under the step plate 1200 as a restriction mechanism. Then, the translational actuators may be extended to come into contact with the lower surface of the step plate 1200 so that the tilting movement of the step plate 1200 in the left/right direction is restricted. In short, any configuration capable of restricting the tilting movement of the step plate 1200 in the left/right direction can be used as the restriction mechanism 500.

Figure 13:
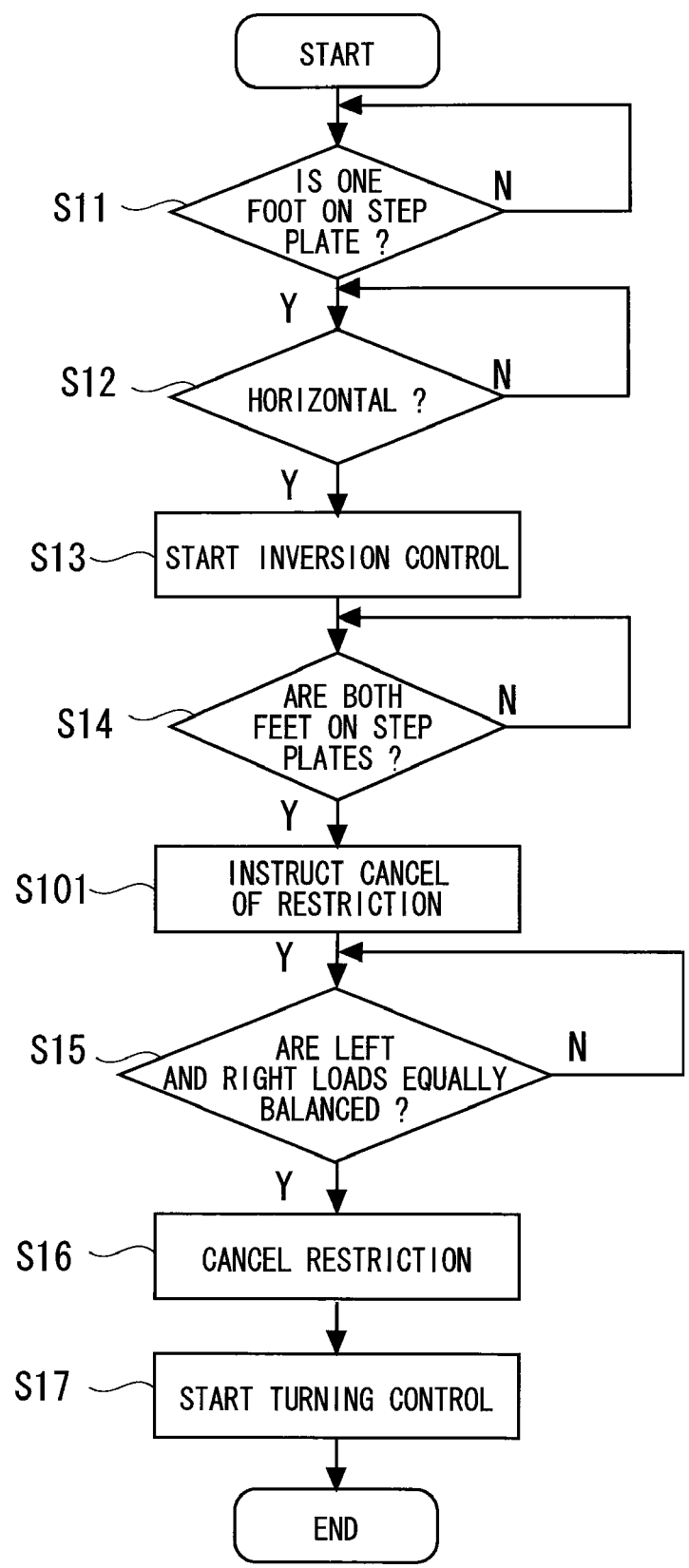
FIG. 13 is a flowchart showing a flow of getting-on assist control of a vehicle of a third exemplary embodiment in accordance with the present invention.

Note that the present invention is not limited to the above-described exemplary embodiments, and various modifications can be made without departing from the spirit of the present invention. For example, although the vehicle 1 in accordance with the first exemplary embodiment does not include the action instruction unit, it may include the action instruction unit. In such a case, the getting-on assist control that is performed when a rider gets on the vehicle is performed in accordance with the flow shown in FIG. 13. That is, after the rider put his/her feet on the left and right step plates 120, the rider operate the action instruction unit to pull in the restriction pieces 51 of the restriction mechanism 50 (S101).

The vehicles in accordance with the first to third exemplary embodiments are merely examples. The present invention may be applied to any vehicles that perform a turning movement base on the tilting movement of the step plate in the left/right direction.

INDUSTRIAL APPLICABILITY

A vehicle in accordance with the present invention is used as a vehicle that a rider can safely get on/off.

REFERENCE SIGNS LIST

1 VEHICLE
10 VEHICLE BODY
20 WHEEL
30 WHEEL DRIVE UNIT
40 SUPPORT MEMBER
50 RESTRICTION MECHANISM
51 RESTRICTION PIECE
52 RESTRICTION MECHANISM CONTROL DEVICE
53 GETTING-OFF ASSIST SWITCH
54 GETTING-ON ASSIST SWITCH
55 LOAD SENSOR
60 ANGLE DETECTION SENSOR
61 BATTERY
62 POSTURE DETECTION SENSOR UNIT
63 VEHICLE CONTROL DEVICE
64 (64L, 64R) DRIVE CIRCUIT
71 JOYSTICK
72 MODE SELECT SWITCH
73 ACTION INSTRUCTION UNIT
101 VEHICLE
110 PARALLEL LINKAGE
111, 112 HORIZONTAL LINK
113 VERTICAL LINK
114 TURNING SUPPORT PIN
115 RESTORATION MEMBER
116 TURNING SUPPORT SHAFT
120 STEP PLATE
410 HANDLE
412 SUPPORT PORTION
420 HANDLE BAR
430 HANDLE BAR BRACKET
500 RESTRICTION MECHANISM
1100 VEHICLE MAIN BODY
1101 ROTATION SHAFT
1102 JIG
1200 STEP PLATE

The invention claimed is:

1. A vehicle having a step plate on which a rider rides and that performs a turning movement based on a rotation of the step plate in a left/right direction, comprising:
 a restriction mechanism to allow the rotation of the step plate in the left/right direction to be restricted;

a first control unit to control the restriction mechanism so that the rotation of the step plate in the left/right direction is restricted when the rider gets on the step plate or the rider gets off the step plate;

a first detection unit to detect a rotation angle of the step plate; and a second detection unit to detect a load exerted on the step plate, wherein the first control unit starts getting-off assist control in a state where the rotation of the step plate in the left/right direction is permitted; when determined that the step plate is in a roughly horizontal state based on the rotation angle of the step plate detected by the first detection unit, controls the restriction mechanism so that the rotation of the step plate in the left/right direction is restricted; and when determined that the rider has gotten off the step plate based on the load exerted on the step plate that is detected by the second detection unit, finishes the getting-off assist control in a state where the rotation of the step plate in the left/right direction is restricted, and the first control unit starts getting-on assist control in the state where the rotation of the step plate in the left/right direction is restricted; when determined that the rider has gotten on the step plate based on the load exerted on the step plate that is detected by the second detection unit, controls the restriction mechanism so that the rotation of the step plate in the left/right direction is permitted; and finishes the getting-on assist control in the state where the rotation of the step plate in the left/right direction is permitted.

2. The vehicle according to claim 1, further comprising:
a first operation unit that is operated by the rider to perform a turning movement of the vehicle; and
a second control unit to control a wheel either in a turning mode of the vehicle based on an operation of the first operation unit or in a turning mode of the vehicle based on a rotation of the step plate in the left/right direction.

3. The vehicle according to claim 2, wherein the second control unit makes switching to the turning mode of the vehicle based on the operation of the first operation means available when the restriction mechanism is restricting the rotation of the step plate in the left/right direction.

4. The vehicle according to claim 1, further comprising a second operation unit that is operated by the rider to make the restriction mechanism restrict or permit the rotation of the step plate in the left/right direction.

5. The vehicle according to claim 1, further comprising a vehicle main body that supports the step plate, wherein
the vehicle main body is a parallel linkage configured to rotate in the left/right direction, the parallel linkage comprising top and bottom horizontal links and left and right vertical links, and the step plate being disposed on an upper end of each of the left and right vertical links, and the restriction mechanism restricts the rotation of the step plate in the left/right direction by restricting a rotation of the vehicle main body.

6. The vehicle according to claim 5, wherein the restriction mechanism comprises a restriction piece that protrudes under control of the first control unit, the restriction mechanism being disposed near a connecting portion between the horizontal link and the vertical link and being configured so that the protruded restriction piece comes into contact with the horizontal link or the vertical link and thereby restricts a rotation of the vehicle main body in the left/right direction.

7. The vehicle according to claim 1, further comprising a vehicle main body, the vehicle main body being connected to the step plate through a rotation shaft so as to permit the rotation of the step plate in a left/right direction,
wherein the restriction mechanism restricts the rotation of the step plate in the left/right direction by restricting a rotation of the rotation shaft.

8. A vehicle having a step plate on which a rider rides and that performs a turning movement based on a rotation of the step plate in a left/right direction, comprising:
restriction means to allow the rotation of the step plate in the left/right direction to be restricted;
first control means to control the restriction means so that the rotation of the step plate in the left/right direction is restricted when the rider gets on the step plate or the rider gets off the step plate;
a first detection unit to detect a rotation angle of the step plate; and
a second detection unit to detect a load exerted on the step plate, wherein
the first control unit starts getting-off assist control in a state where the rotation of the step plate in the left/right direction is permitted; when determined that the step plate is in a roughly horizontal state based on the rotation angle of the step plate detected by the first detection unit, controls the restriction mechanism so that the rotation of the step plate in the left/right direction is restricted; and when determined that the rider has gotten off the step plate based on the load exerted on the step plate that is detected by the second detection unit, finishes the getting-off assist control in a state where the rotation of the step plate in the left/right direction is restricted, and
the first control unit starts getting-on assist control in the state where the rotation of the step plate in the left/right direction is restricted; when determined that the rider has gotten on the step plate based on the load exerted on the step plate that is detected by the second detection unit, controls the restriction mechanism so that the rotation of the step plate in the left/right direction is permitted; and finishes the getting-on assist control in a state where the rotation of the step plate in the left/right direction is permitted.

* * * * *